US010974799B2

(12) United States Patent
Oakes

(10) Patent No.: US 10,974,799 B2
(45) Date of Patent: Apr. 13, 2021

(54) AUDIO TRANSDUCER ATTACHED TO WINDSHIELD OR DOOR

(71) Applicant: Taylor Made Group, LLC, Gloversville, NY (US)

(72) Inventor: Philip A. Oakes, Middle Grove, NY (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 16/356,613

(22) Filed: Mar. 18, 2019

(65) Prior Publication Data

US 2019/0283846 A1 Sep. 19, 2019

Related U.S. Application Data

(60) Provisional application No. 62/643,817, filed on Mar. 16, 2018.

(51) Int. Cl.

| | |
|---|---|
| ***H04B 1/00*** | (2006.01) |
| ***B63B 45/08*** | (2006.01) |
| ***H04R 1/02*** | (2006.01) |
| ***B63B 45/00*** | (2006.01) |

(52) U.S. Cl.

CPC .............. *B63B 45/08* (2013.01); *B63B 45/00* (2013.01); *H04R 1/02* (2013.01); *B63B 2045/005* (2013.01); *H04R 2499/13* (2013.01)

(58) Field of Classification Search

CPC ............ B63B 45/08; B63B 45/00; H04R 1/02

See application file for complete search history.

(56) References Cited

U.S. PATENT DOCUMENTS 3,925,627 A 12/1975 Ashworth
6,760,461 B2 7/2004 Azima et al.
7,447,322 B2 11/2008 Harris, Jr. et al.
7,986,799 B2 7/2011 Gustavsson
8,155,344 B2 4/2012 Iimori et al.
8,180,065 B2 5/2012 Snider
8,208,655 B2 6/2012 Kim et al.
8,389,120 B2 3/2013 Delatte
8,457,325 B2 6/2013 Snider et al.
9,469,254 B1 * 10/2016 White .................... H04R 1/026
9,554,202 B1 * 1/2017 Patsis ..................... H04R 1/026
2008/0245288 A1 * 10/2008 Bach ....................... B63B 17/02 114/361
2010/0290639 A1 11/2010 Snider et al.
2010/0316236 A1 12/2010 Snider et al.
2012/0223543 A1 9/2012 Snider et al.
2013/0228392 A1 * 9/2013 Iwata ..................... G10K 11/08 181/148
2014/0190391 A1 * 7/2014 Dube ...................... B63B 19/02 114/361
2014/0335902 A1 * 11/2014 Guba .................... H04W 4/027 455/456.4

(Continued)

FOREIGN PATENT DOCUMENTS

JP 56-93499 7/1981

*Primary Examiner* — Simon King

(74) *Attorney, Agent, or Firm* — Nixon & Vanderhye P.C.

(57) ABSTRACT

An audio system in a marine vessel may be created or enhanced using existing parts of the marine vessel. One or more audio transducers may be secured directly to the windshield, and once connected with an audio input, the windshield acts as a transparent speaker.

17 Claims, 4 Drawing Sheets

(56) References Cited

U.S. PATENT DOCUMENTS

| | | | | |
|---|---|---|---|---|
| 2015/0237440 A1* | 8/2015 | Fromel | H04R 1/22 381/334 |
| 2015/0298656 A1 | 10/2015 | Pascoe | |
| 2017/0075740 A1* | 3/2017 | Breaux | G06F 9/542 |
| 2017/0169810 A1* | 6/2017 | Nesbit, Jr. | H04R 1/345 |
| 2018/0314487 A1* | 11/2018 | Lynema | H04R 1/345 |
| 2019/0049835 A1* | 2/2019 | Fujimura | G03B 21/60 |
| 2019/0092437 A1* | 3/2019 | Coletti | B63B 45/08 |
| 2019/0387322 A1* | 12/2019 | Akiyama | H04R 7/02 |

* cited by examiner

AUDIO TRANSDUCER ATTACHED TO WINDSHIELD OR DOOR

CROSS-REFERENCES TO RELATED APPLICATIONS

This application claims the benefit of U.S. Provisional Patent Application No. 62/643,817, filed Mar. 16, 2018, the entire content of which is herein incorporated by reference.

STATEMENT REGARDING FEDERALLY SPONSORED RESEARCH OR DEVELOPMENT (NOT APPLICABLE)

BACKGROUND

Traditional Marine audio speakers are located below the deck line, in the cockpit area, or high up on a tower. These are not in the best locations to provide an optimal audio experience for the boat's occupants as the sound is not aimed at their heads. Typical marine speakers are also big and bulky and can require a large amount of space to install.

An audio transducer or "exciter" is basically the driver part of a speaker. Part of the audio transducer vibrates with an audio input. When the vibrating part of the audio transducer is placed on a solid object, the vibrations transfer into the object causing it to vibrate as well.

BRIEF SUMMARY

When an audio transducer with an input signal (or other device that can convert an audio electrical signal into movement or vibration) is introduced to a surface, it translates its vibrations to that surface. The vibrating surface then vibrates the surrounding air creating sound. When an audio transducer is introduced to a boat windshield, it has been discovered that the audio transducer essentially turns that windshield into a giant transparent speaker.

The shape of the windshield helps to direct or focus the sound energy into the cockpit and at the occupants surrounding them with sound that is brought up to head level. The overall setup can include door panels, roof panels or other surfaces in which to produce sound. Multiple sections of windshield can be linked together to create a multi-speaker surround system, each panel acting as its own independent speaker.

BRIEF DESCRIPTION OF THE DRAWINGS

These and other aspects and advantages will be described in detail with reference to the accompanying drawings, in which.

DETAILED DESCRIPTION

Figure 1:
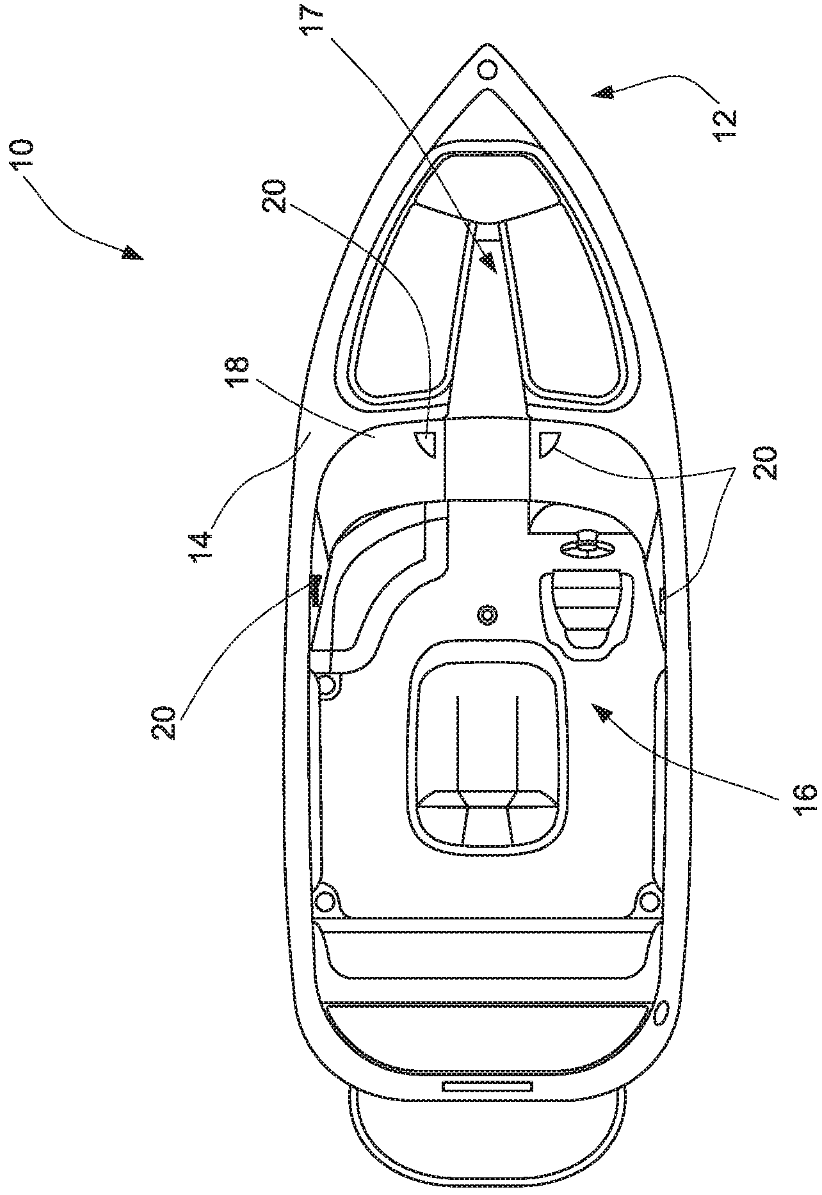
FIG. 1 is a plan view of a marine vessel incorporating the features of the described embodiments.

FIG. 1 is a plan view of a marine vessel 10 including a hull 12, a deck 14, a passenger area 16, a bow area 17, and a windshield 18 between the passenger area 16 and the bow area 17. As noted, when an audio transducer with an input signal (or other device that can convert an audio electrical signal into movement or vibration) is introduced to a surface, it translates its vibrations to that surface. The vibrating surface then vibrates the surrounding air creating sound. According to embodiments of the present description, an audio transducer or "exciter" 20 is secured directly to the windshield 18, preferably but not necessarily on a passenger area 16 side of the windshield 18. Vibrations from the audio transducers 20 are transferred to the windshield 18, and the windshield 18 becomes a transparent speaker.

Figure 2:
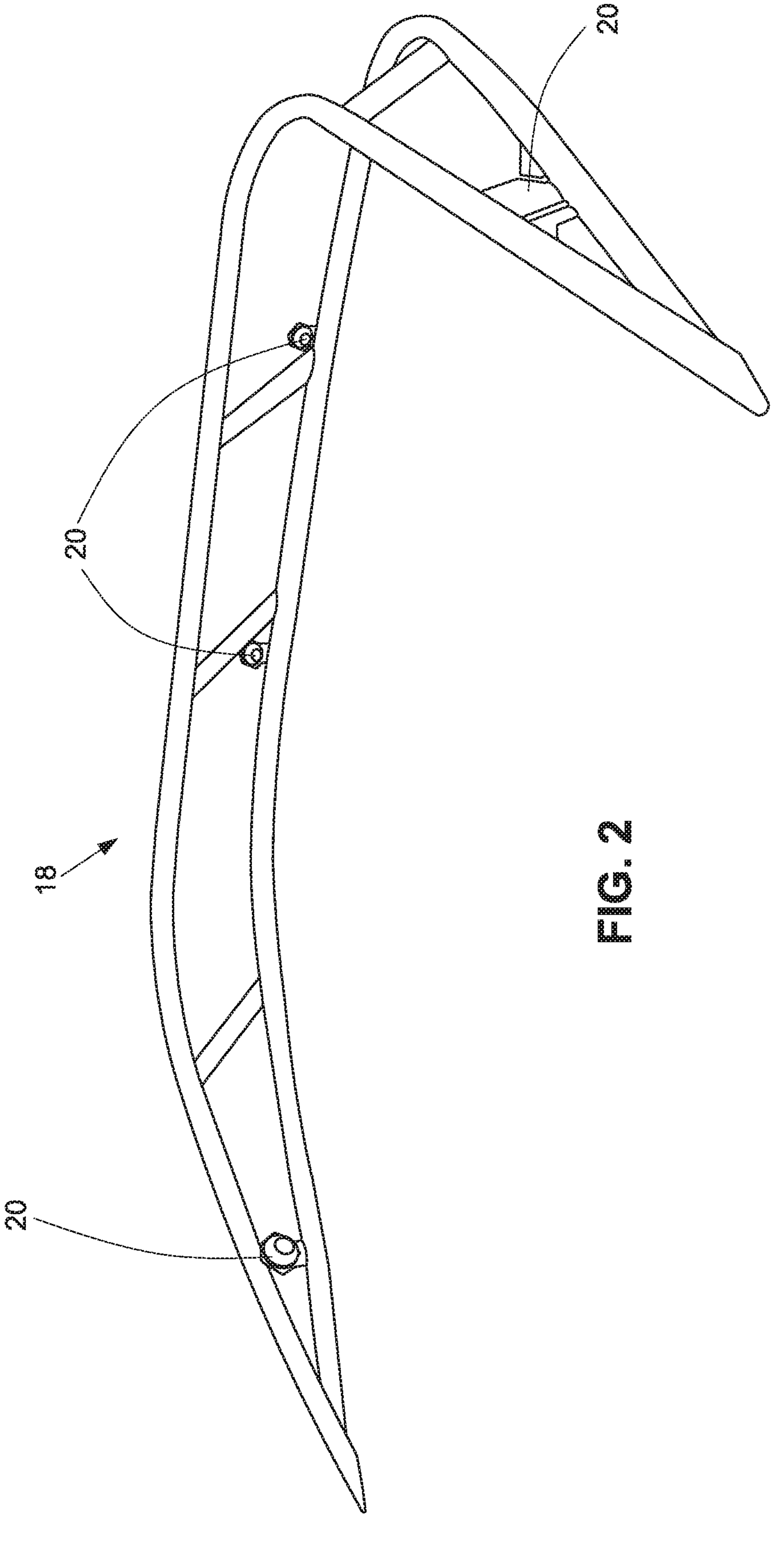
FIG. 2 is a perspective view of a boat windshield and attached audio transducers.

A single audio transducer 20 is sufficient to generate vibrations such that the windshield 18 creates sound. In some embodiments, multiple audio transducers 20 are secured directly to the windshield 18. As shown in FIGS. 1 and 2, for example, four audio transducers 20 may be secured directly to the windshield 18 including a first audio transducer 20 secured adjacent a port wing of the windshield 18, a second audio transducer 20 secured adjacent a port front of the windshield 18, a third audio transducer 20 secured adjacent a starboard front of the windshield 18, and a fourth audio transducer 20 secured adjacent a starboard wing of the windshield 18. The audio transducers 20 are preferably secured to the windshield 18 via an adhesive or the like. By securing the audio transducers 20 to the windshield 18, the audio transducers cause the windshield to deliver sound at a position substantially level with a head of an average height passenger sitting in the passenger area 16.

Figure 3:
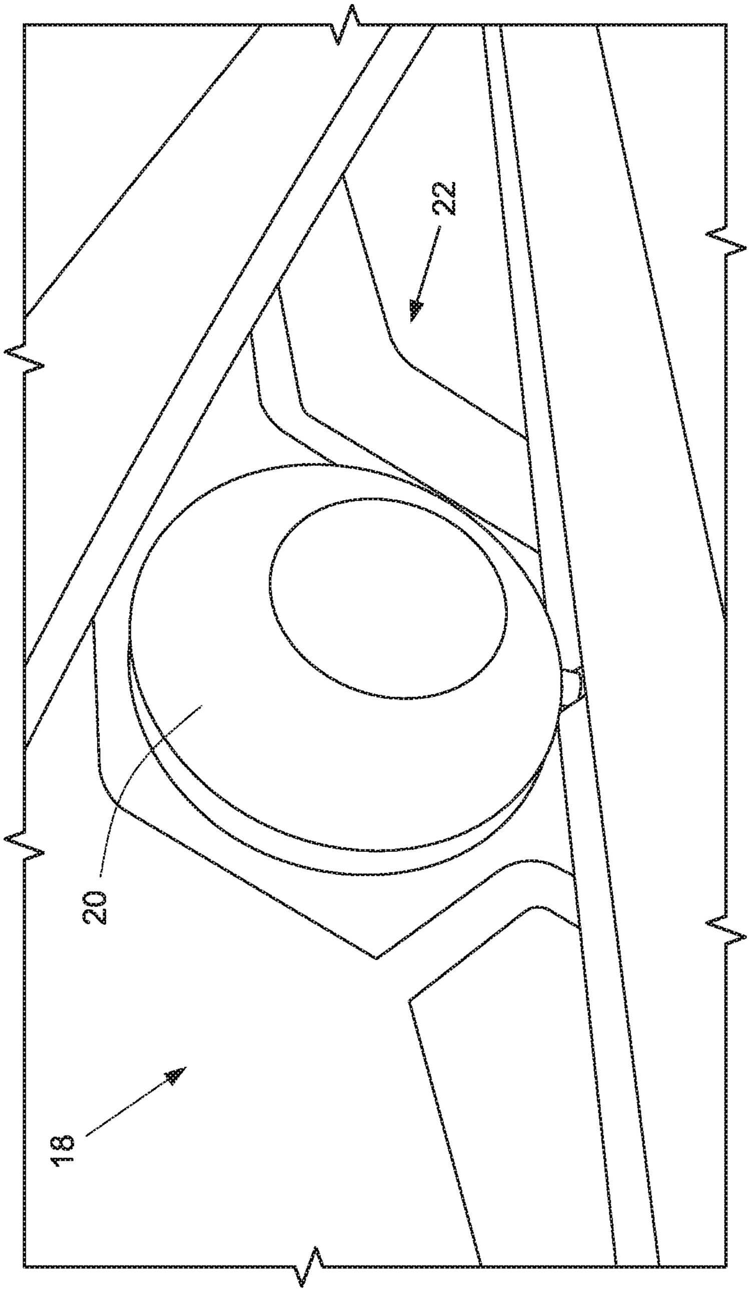
FIG. 3 is a close-up view of an audio transducer secured to a windshield.

As shown in FIG. 3, it is desirable to secure the transducer 20 to an area of the windshield 18 including a frit pattern 22. The frit pattern 22 helps to prevent damage from UV rays to the audio transducer 20 and the adhesive securing the audio transducer 20 to the windshield 18.

Figure 4:
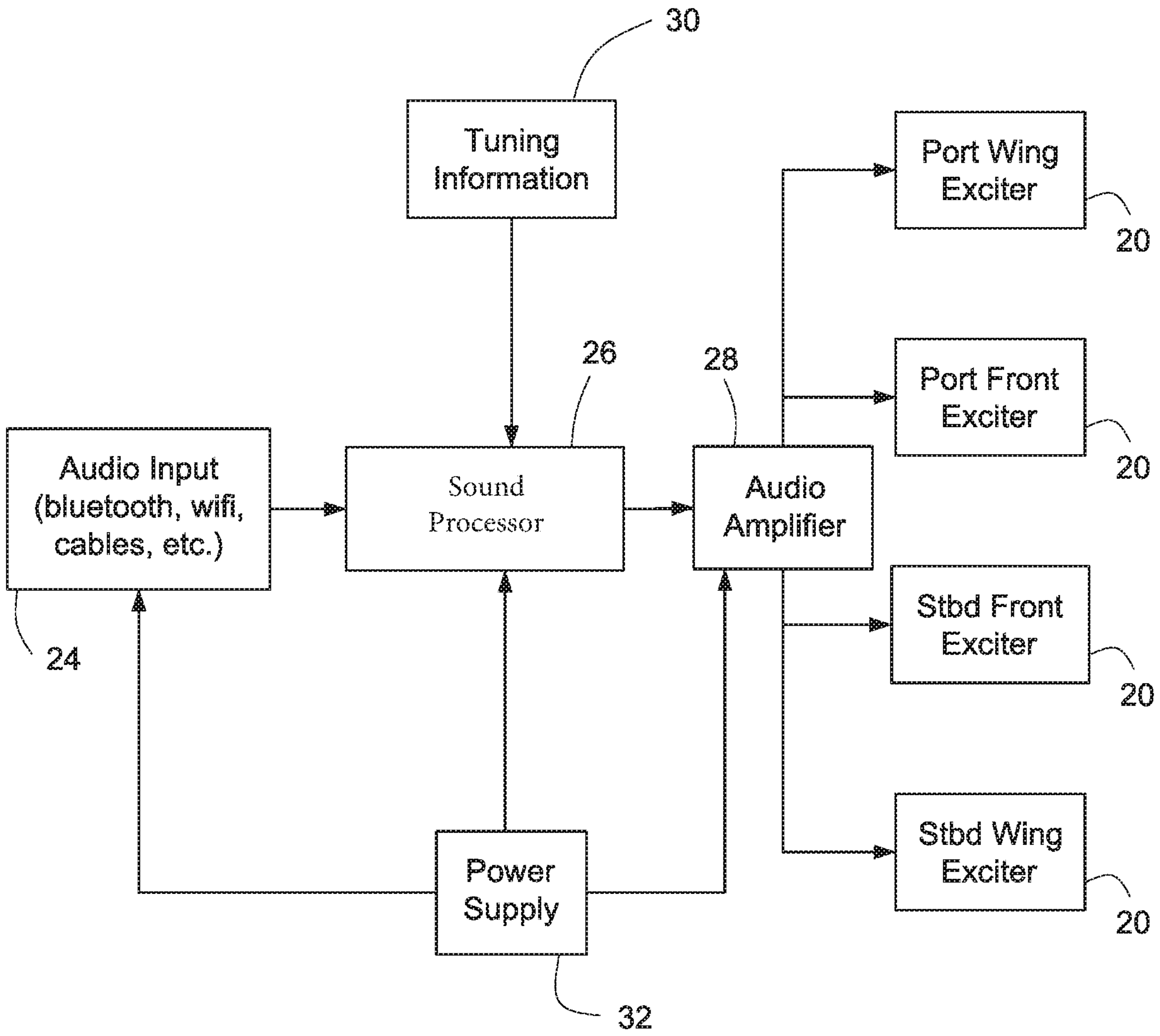
FIG. 4 is a schematic diagram of the sound system.

With reference to FIG. 4, the source of sound data input to the audio transducers 20 is provided by an audio input 24 (e.g., Bluetooth, Wi-Fi, cables, etc.) coupled with a sound processor 26, for example a digital sound processor (DSP) or the like, which input is amplified via an audio amplifier 28. An alternative source for the sound processor 26 may be a radio receiver 30 or the like. The components are connected with a power supply 32 and output the sound data to the one or more audio transducers 20.

The sound processor 26 allows a user, manufacturer, etc. to adjust the individual audio frequencies and utilize frequencies that are natural to the glass and amplify those that are muted. The audio frequencies can thus be tuned via the sound processor 26 according to structural characteristics of the windshield 18. For example, each piece of glass is affected by its size, shape, attachment and surroundings. The sound processor 26 allows individual tuning of each audio transducer 20 to bring out the best sound quality and range possible from each panel of the windshield 18. An optimized audio signal is then sent to the amplifier 28 prior to output to the audio transducers 20.

Procedurally, it is desirable to place the audio transducers 20 in the largest areas of the windshield 18 as possible while still maintaining a desired aesthetic appearance. In some embodiments, after cleaning the glass, the audio transducers 20 are secured to the windshield 18 in the chosen position (preferably behind the frit pattern 22 as noted above) via an adhesive. The assembled windshield may then be attached to the boat. Subsequently, the audio input 24, sound processor 26 and audio amplifier 28 are coupled with the power supply 32 and wired for output to the audio transducers 20. Sound tests are conducted, and adjustments are made in the sound processor to optimize the sound output.

The audio windshield can be used by itself or in conjunction with additional speakers. Because the windshield 18 is already a component of the boat, no additional speaker space is needed. The transducers 20 can also be integrated into structural members of the windshield and use the aforementioned structural members as part of the transducer and/or sound system.

The glass panels in a marine windshield may be secured around their entire perimeter by bonding (gluing) to a frame or some form of encapsulating frame with gasket or combination of the two. This framework is then securely fastened to the boat deck. There can be multiple instances of the glass and frame sections secured to each other and also to the deck. Each piece can contain one or more transducers 20 independent from the others to create a complete surround audio system.

The curvature of the marine windshield glass focuses the sound and improves the sound quality within the passenger area 16 of the boat.

In some embodiments, the transducer 20 may be concealed and/or integrated as part of a structural member of the windshield 18 (cast or billet aft corner for example). This structural member may function as part of the transducer and/or audio system. That is, the transducer 20 may be secured to parts of the windshield other than the glass.

Sound travels in compression waves that can bounce off of objects and surfaces. These bounces, or reflections, can have different effects on the sound. For simplicity purposes, the reflection of flat waves sound reflecting off of consistently curved services in two dimensions will be described. As sound waves contact a concave surface, they are reflected inward at the same angle at which they made contact with the surface. This focuses the sound waves to a single point. The sound energy is also focused making the sound appear louder and of higher quality around the focal point. As sound waves contact a convex surface, they are reflected outward at the same angle that they make contact. This spreads out the sound waves and in doing so, spreads out the sound energy, reducing the amount of what someone could hear making the source appear quieter. A concave surface on one side of the windshield naturally has a convex shape on the opposite side. With the windshield itself as the sound source, the convex side sends sound energy normal to its surface, and this energy would spread over a large area. The concave side radiates the sound energy normal to its surface creating a focal point. With the curvature of a boat windshield in three dimensions, the sound energy on the concave side of the windshield is focused within the cockpit of the boat, flooding it with the sense of louder, higher quality stereophonic sound. The convex side of the windshield spreads the sound out around the perimeter of the windshield, providing sound for the people outside the cockpit and surrounding area.

The sound system is well-suited for a marine vessel application. With the sound concentrated in the passenger area 16, due to the curvature and position of the windshield 18, the best quality and loudest sound can be focused at passenger head level. It is typical for occupants to sit or congregate in the bow area 17 of the vessel, on the convex side of the windshield. Due to the convex shape, the sound in the bow area 17 on the convex side of the windshield can still be heard, but at a lower volume, thereby permitting occupants to have normal conversation.

The features of the described embodiments serve to create or enhance an audio system in a marine vessel using existing parts of the marine vessel. A sound processor, which may be a digital sound processor, provides for the adjustment of individual audio frequencies based on characteristics of the windshield to enable individual tuning of each transducer to bring out the best sound quality and range possible from each windshield panel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of creating or enhancing an audio system in a marine vessel using existing parts of the marine vessel, the marine vessel including a hull, a deck, a passenger area and a windshield, the method comprising:

(a) securing an audio transducer directly to the windshield;

(b) connecting the audio transducer to an audio input, a sound processor, and an audio amplifier; and (c) the audio transducer vibrating the windshield based on sound data from the audio input whereby the windshield acts as a speaker to output sound.

2. A method according to claim 1, wherein step (a) is practiced by securing multiple audio transducers directly to the windshield.

3. A method according to claim 2, wherein step (a) is practiced by securing four audio transducers directly to the windshield including a first audio transducer secured adjacent a port wing of the windshield, a second audio transducer secured adjacent a port front of the windshield, a third audio transducer secured adjacent a starboard front of the windshield, and a fourth audio transducer secured adjacent a starboard wing of the windshield.

4. A method according to claim 1, further comprising connecting a power source to the audio input, the sound processor, and the audio amplifier.

5. A method according to claim 1, wherein the sound processor is a digital sound processor.

6. A method according to claim 5, further comprising adjusting audio frequencies via the digital sound processor according to structural characteristics of the windshield.

7. A method according to claim 6, wherein the structural characteristics of the windshield include size, shape, means of attachment to the deck, and surroundings.

8. A method according to claim 1, further comprising delivering sound at a position substantially level with a head of an average height passenger sitting in the passenger area.

9. A method according to claim 1, wherein prior to step (a), the method comprises providing a frit pattern on the windshield, and wherein step (a) is practiced by securing the audio transducer over the frit pattern.

10. A method according to claim 1, wherein step (a) is practiced by securing the audio transducer directly to a passenger area side the windshield.

11. A method of creating a speaker system for a marine vessel without a sound system using existing parts of the marine vessel, the marine vessel including a windshield, the method comprising securing an audio transducer directly to the windshield, activating the audio transducer based on sound data from a source, and the audio transducer vibrating the windshield to output sound.

12. A method according to claim 11, wherein the source is at least one of an audio input, a sound processor, and an audio amplifier.

13. A method of creating or enhancing an audio system in a marine vessel using existing parts of the marine vessel, the marine vessel including a hull, a deck, a passenger area, a bow area, and a windshield between the passenger area and the bow area, the method comprising:

(a) delivering sound to the passenger area at a first volume by an audio transducer vibrating the windshield; and (b) delivering sound via the windshield to the bow area at a second volume, lower than the first volume, wherein the sound delivered in steps (a) and (b) is from a same source.

14. A method according to claim 13, wherein steps (a) and (b) are practiced by securing the audio transducer directly to the windshield.

15. A method according to claim 14, wherein steps (a) and (b) are practiced by securing the audio transducer directly to a passenger area side of the windshield.

16. A method according to claim 14, further comprising connecting the audio transducer to an audio input, a sound processor, and an audio amplifier.

17. A method according to claim 13, wherein step (a) is practiced by delivering the sound at a position substantially level with a head of an average height passenger sitting in the passenger area.

* * * * *